United States Patent
Victor et al.

(10) Patent No.: US 11,475,012 B2
(45) Date of Patent: Oct. 18, 2022

(54) REAL-TIME DATA RETRIEVAL

(71) Applicant: SingleStore, Inc., San Francisco, CA (US)

(72) Inventors: Joseph Victor, Redwood City, CA (US); Francis Williams, New York, NY (US); Carl Sverre, San Francisco, CA (US); Steven Camina, San Francisco, CA (US); Hurshal Patel, San Francisco, CA (US)

(73) Assignee: SingleStore, Inc., San Francisco, CA (US)

( * ) Notice: Subject to any disclaimer, the term of this patent is extended or adjusted under 35 U.S.C. 154(b) by 107 days.

(21) Appl. No.: 15/714,983

(22) Filed: Sep. 25, 2017

(65) Prior Publication Data

US 2018/0089276 A1    Mar. 29, 2018

Related U.S. Application Data

(60) Provisional application No. 62/399,965, filed on Sep. 26, 2016.

(51) Int. Cl.
| | |
|---|---|
| *G06F 16/24* | (2019.01) |
| *G06F 16/2455* | (2019.01) |
| *G06F 16/22* | (2019.01) |
| *G06F 16/25* | (2019.01) |
| *G06F 16/27* | (2019.01) |

(52) U.S. Cl.
CPC ...... *G06F 16/2456* (2019.01); *G06F 16/2282* (2019.01); *G06F 16/254* (2019.01); *G06F 16/258* (2019.01); *G06F 16/278* (2019.01)

(58) Field of Classification Search
CPC .................................................. G06F 16/2456
USPC ......................................................... 707/602
See application file for complete search history.

(56) References Cited

U.S. PATENT DOCUMENTS

| | | | |
|---|---|---|---|
| 9,135,310 B2 | 9/2015 | Shamgunov | |
| 9,141,678 B2 | 9/2015 | Skidanov | |
| 9,223,805 B2 | 12/2015 | Skidanov | |
| 9,317,552 B2 | 4/2016 | Prout | |
| 9,900,397 B1 * | 2/2018 | Cope | H04L 67/2842 |
| 2006/0206662 A1 * | 9/2006 | Ludwig | G06F 3/0607 |
| | | | 711/114 |
| 2011/0047347 A1 * | 2/2011 | Li | G06F 3/064 |
| | | | 711/209 |
| 2015/0134795 A1 * | 5/2015 | Theimer | G06F 16/254 |
| | | | 709/223 |

(Continued)

*Primary Examiner* — Syling Yen
(74) *Attorney, Agent, or Firm* — EIP US LLP

(57) ABSTRACT

A non-transitory computer-readable medium is provided. The medium comprises a set of instructions, which, when executed by a processing system associated with a database or data warehouse, causes the processing system to retrieve data from a data source in accordance with a mapping between a first set of partitions and a second set of partitions, the first set of partitions being associated with the data source and the second set of partitions being associated with the database. The set of instructions, when executed by the processing system, further causes the processing system to load the retrieved data into the database. Retrieving the data and loading the retrieved data comprise a single logical unit of work. A database system and a method executed by a processing system associated with a database are also provided.

18 Claims, 4 Drawing Sheets

(56) References Cited

U.S. PATENT DOCUMENTS

2017/0083396 A1\* 3/2017 Bishop ................ G06F 11/1471
2017/0310628 A1\* 10/2017 Norwood ................ H04L 51/18
2018/0159731 A1\* 6/2018 Murthy ............. G06F 16/24558
2018/0293108 A1\* 10/2018 Tang ..................... G06F 15/167

\* cited by examiner

REAL-TIME DATA RETRIEVAL

CROSS-REFERENCE TO RELATED APPLICATIONS

The present application claims priority to U.S. Provisional Application No. 62/399,965, filed on Sep. 26, 2016, the entire contents of which are incorporated herein by reference.

BACKGROUND

Field of the Disclosure

Embodiments of the present disclosure relate to computer readable medium, methods and systems for enabling real-time data retrieval from data sources.

Description of the Related Technology

Database products provide native mechanisms to load data. Databases are historically known to only natively load data from files. Modern database workloads require data ingestion from an increasingly large ecosystem of data sources such as streaming data sources or cloud repositories such as Amazon S3. These sources often use unique protocols or schemas and thus require custom connectivity that must be updated regularly.

The challenges posed by this dynamic ecosystem are conventionally resolved by using middleware, which is software that knows how to deal with the nuances of each data source and can perform the process of Extract, Transform, and Load (ETL). This ETL process ensures that source data is properly structured and stored in a database.

Most ETL processes are external, third-party systems that integrate with a database, which is to say that they are not a component of the database itself. As a result, ETL middleware can introduce additional problems of its own, such as cost, complexity, latency, maintenance, and downtime.

SUMMARY

A first aspect includes a non-transitory computer-readable medium comprising a set of instructions, which, when executed by a processing system associated with a database, data warehouse or data lake, causes the processing system to retrieve data from a data source in accordance with a mapping between a first set of partitions and a second set of partitions, the first set of partitions being associated with the data source and the second set of partitions being associated with the database. The set of instructions, when executed by the processing system, further cause the processing system to load the retrieved data into the database. Retrieving the data and loading the retrieved data comprise a single logical unit of work.

A second aspect includes a database system including at least one processor and at least one memory including computer program instructions. The at least one memory and the computer program instructions are configured to, with the at least one processor, cause the database system at least to retrieve data from a data source in accordance with a mapping between a first set of partitions and a second set of partitions, the first set of partitions being associated with the data source and the second set of partitions being associated with the database. The computer program instructions are configured to, with the at least one processor, cause the database system at least to load the retrieved data into the database. Retrieving the data and loading the retrieved data comprise a single logical unit of work.

A third aspect includes a method executed by a processing system associated with a database. The method includes retrieving data from a data source in accordance with a mapping between a first set of partitions and a second set of partitions, the first set of partitions being associated with the data source and the second set of partitions being associated with the database. The method includes loading the retrieved data into the database. Retrieving the data and loading the retrieved data comprise a single logical unit of work.

Further features and advantages will become apparent from the following description of preferred embodiments set forth in the present disclosure, given by way of example only, which is made with reference to the accompanying drawings.

DETAILED DESCRIPTION

Embodiments described herein relate to a system for real-time ingestion of data into databases, which is to say instant, or near-instant, storing of streaming data flowing into a database. Such streaming data typically originates from web traffic, sensors on machines, or edge devices, among others. Embodiments seamlessly enable streaming data ingestion at scale, efficiently retrieving from data sources (in a process described herein as "extract"), optionally mapping and enriching the data (in a process described herein as "transform"), and loading the data into a destination database (in a process described herein as "load"), all within one database transaction (in a process described herein as "pipeline").

In embodiments described herein, the system that coordinates the extract, transform (optional) and load process of data sources is a unified pipeline engine, which is a database process that operates within the destination database. Other solutions that claim to pull streaming data typically leverage separate (from the database environment) "middleware" solutions to extract data. That is not only less performant, it also requires additional provisioning and management. Thus, it is the transactional nature of embodiments disclosed herein, which is to say the coordination of the extract, transform and load operations as a single logical unit of work, controlled and executed from within the database environment, which differentiates embodiments over existing systems.

To achieve these effects, embodiments provide a new, unique, database object—a PIPELINE, which is a top-level database element similar to a TABLE, INDEX or VIEW. Pipeline objects allow extraction from external data sources using a robust, database-native mechanism. Embodiments provide particularly advantageous features particularly for external data sources such as Apache Kafka through bespoke offset management of Kafka messages, ensuring true exactly-once semantics.

Streaming data from data sources is committed atomically, and all external data are processed exactly once. Embodiments ensure exactly-once delivery semantics by storing metadata about each pipeline.

Data enrichment and transformation can be implemented using any programming language. Data loading into the destination database happens efficiently and in parallel between data partitions of the destination database and a server of the data source.

Embodiments are particularly well suited to scenarios in which data from a source must be ingested and processed in real time. Embodiments are also a good alternative to third-party middleware for basic ETL operations that must be executed as fast as possible. In particular, traditional long-running processes, such as overnight batch ETL jobs, can be eliminated with embodiments described herein owing to their transactional nature.

Figure 1:
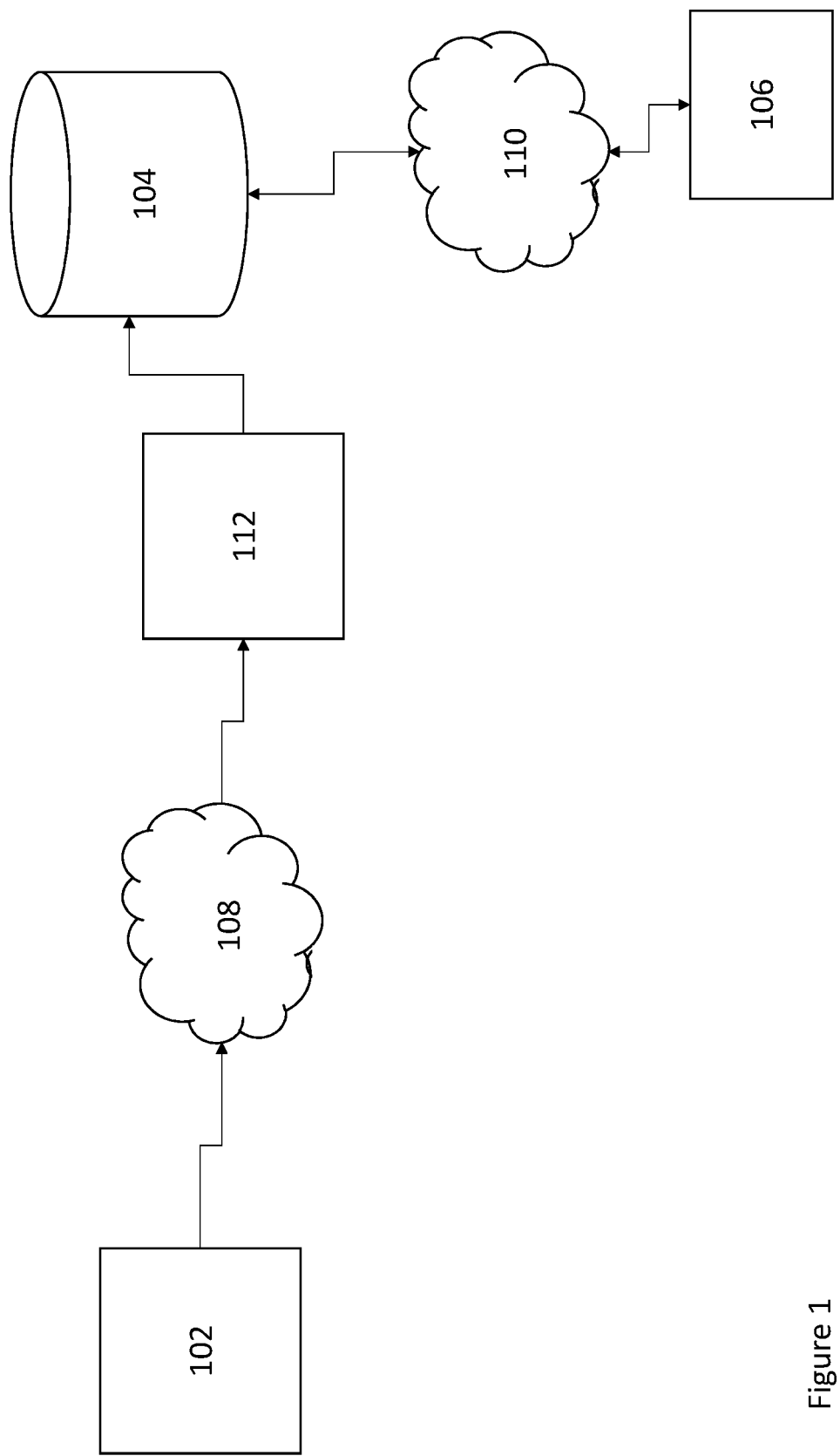
FIG. 1 is a schematic diagram showing an environment within which embodiments described herein may operate.

FIG. 1 is a schematic diagram showing an environment within which embodiments described herein may operate. Part 102 indicates a system that provides a means to access a set of data from a data source. Part 104 is a database into which there are several sets of data accessible from the data source 102 to be stored, e.g., as part of ingestion and for the purposes of performing analytical queries. FIG. 1 also shows a client terminal 106, which submits requests and receives responses from the database 104. Data can be retrieved from data sources 102 over packet data networks, which may be public or private networks 108; similarly, client terminals 106 can request and receive responses from the database 104 over public or private networks 110.

Figure 2:
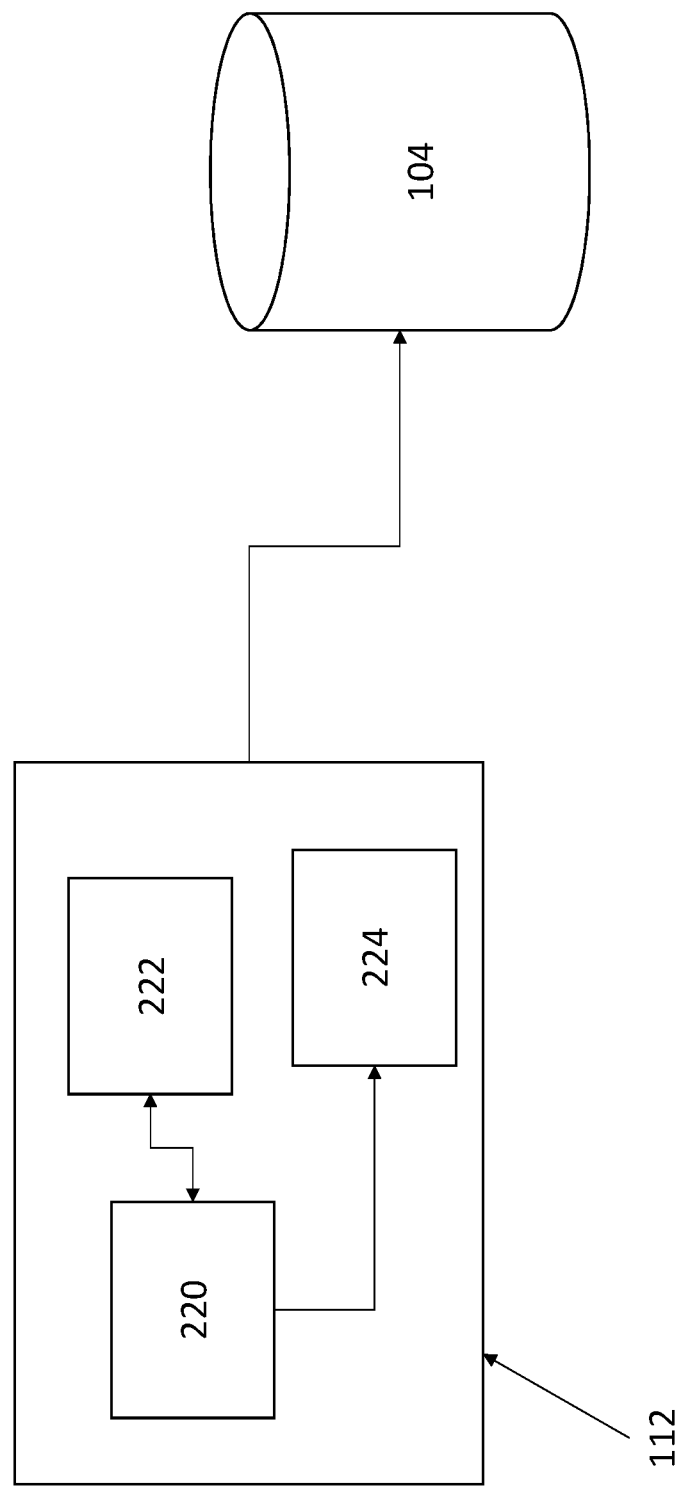
FIG. 2 is a schematic diagram showing a pipeline engine in accordance with an embodiment.

Part 112 is a construct associated with database 104, which performs real time retrieval and processing of data from data sources 102 according to embodiments described herein. Turning to FIG. 2, part 112, hereinafter referred to as a pipeline engine, comprises an extractor component 220, optionally a transform component 222 (to be described in more detail below) and a loader component 224, which cooperates with the extractor component 220 to load data, typically via staging tables, into destination database 104.

When a new pipeline engine 112 is created, an extractor component 220 is specified. The extractor 220 is configured to connect to one or more data sources 102 by communicating via supported protocols, schemas, or APIs, as is known in the art, in order to retrieve data. The extractor 220 can be specified in a LOAD DATA statement. For example, when the data source 102 is an Apache Kafka data source, the extractor component 220 may be specified as 192.168.1.100:9092/my-topic:

```
CREATE PIPELINE mypipeline AS
LOAD DATA KAFKA '192.168.1.100:9092/my-topic'
INTO TABLE t
```

The extractor component 220 is preferably configured such that data is extracted from the data source 102 in parallel to ensure high performance. The specific details of parallelization depend on the partitioning architecture of the data source 102, but exemplary implementations comprise the following. Pipeline engine 112 pairs n number of source partitions with p number of leaf node partitions that are managed by the extractor component 220. Each leaf node partition runs its own extraction process independently of other leaf nodes and their partitions. Extracted data is stored on the leaf node where a partition resides until it can be written to the destination table 104. Depending on the way a destination database is sharded or partitioned, the extracted data may only temporarily be stored on a leaf node.

In preferred embodiments, there is a 1:1 relationship between the number of leaf node partitions and the number of partitions in the data source 102. For example, if the extractor 220 has two leaves with eight partitions each, the data source 102 should similarly have 16 partitions. If the partitions associated with the leaf nodes and the partitions of the data source 102 are not equal in number, leaf nodes will either sit idle or will fall behind other nodes while they finish processing an excess batch of data.

Figure 3:
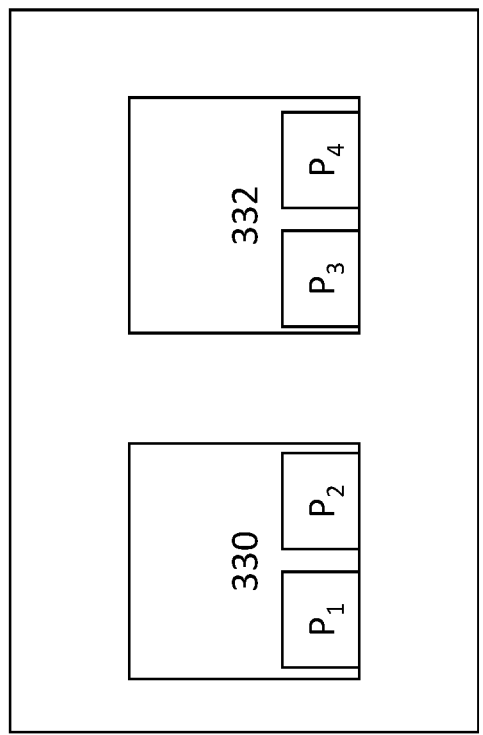
FIG. 3 is a schematic diagram showing a first set of partitions and a second set of partitions in accordance with an embodiment.
Figure 3:
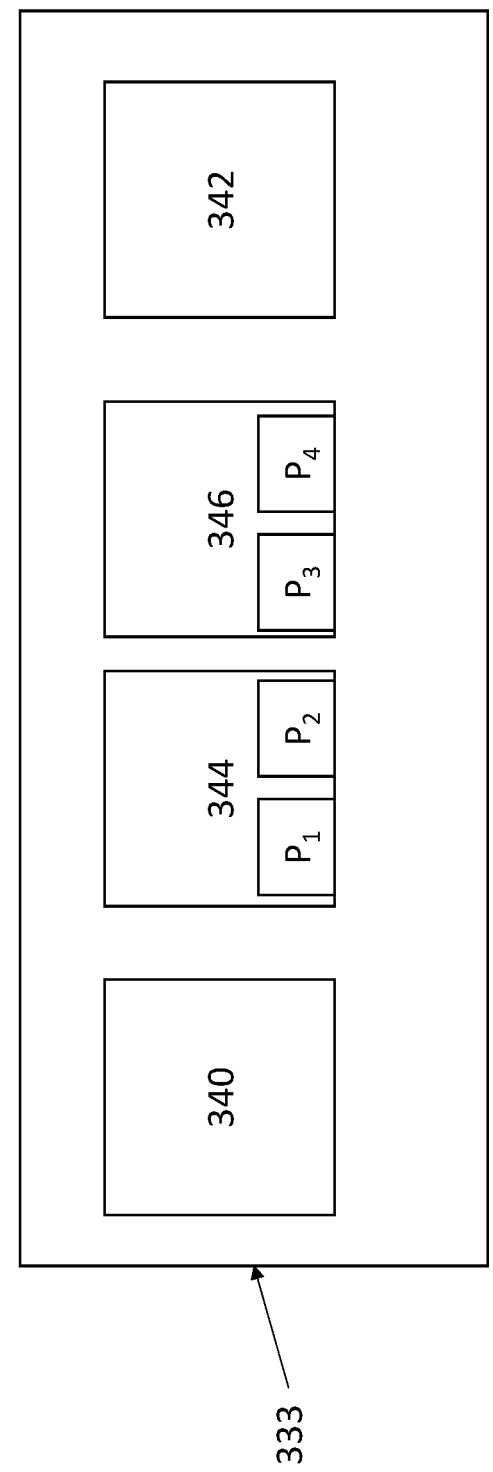
Figure 4:
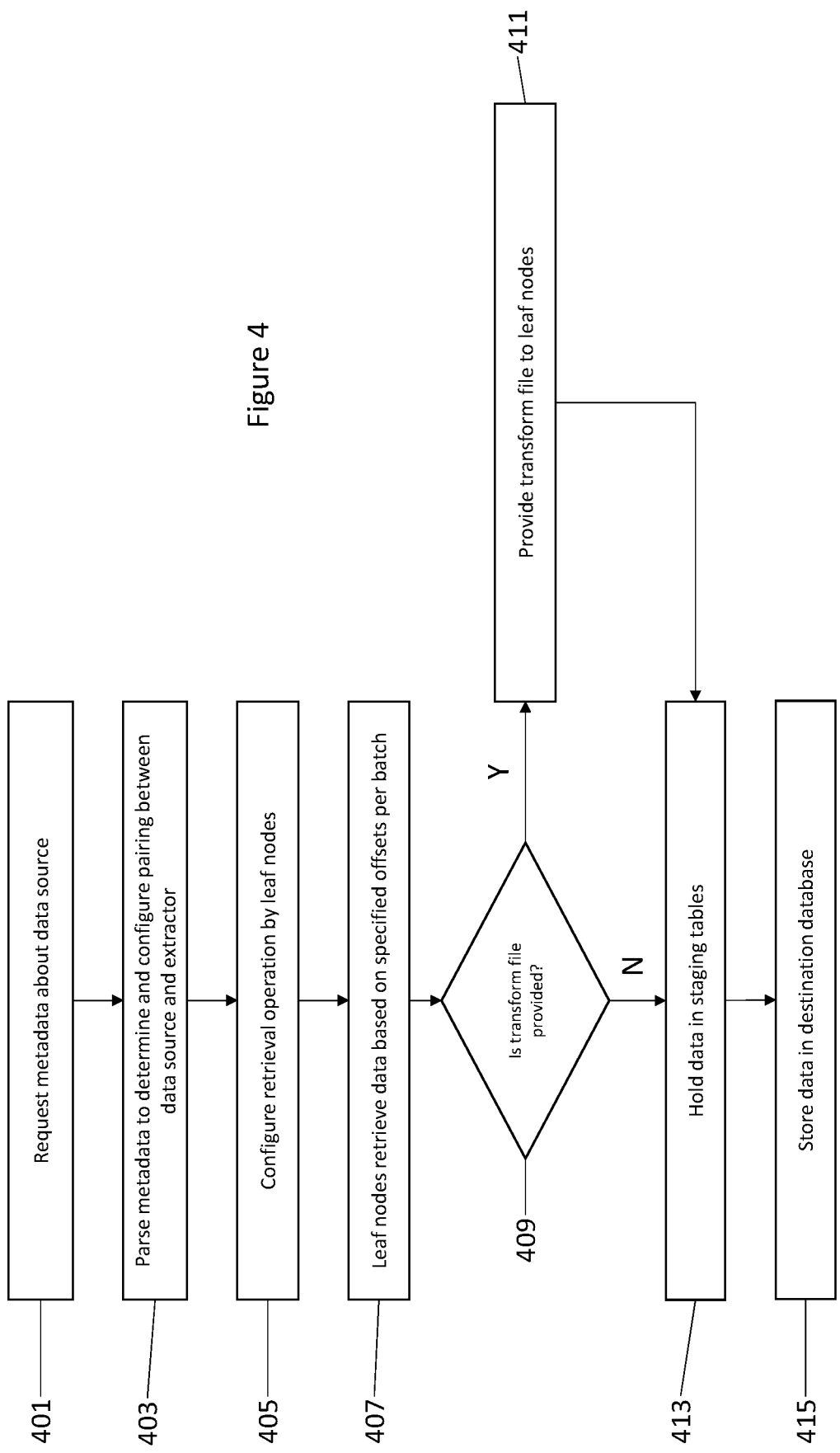
FIG. 4 is a timing diagram illustrating a process of retrieving data in accordance with an embodiment.

Referring to FIGS. 3 and 4, an example scenario will be described, in which the data source 102 is a Kafka cluster with two servers (brokers): one broker is a leader 330 and one broker 332 is a follower. There are four partitions 330 ($P_1$, $P_2$) 332 ($P_3$, $P_4$) spread across the two brokers 330, 332, and messages in the partitions 330 ($P_1$, $P_2$) 332 ($P_3$, $P_4$) are each assigned a sequential id number called the offset that uniquely identifies each message within a given partition. The extractor component 220 comprises a cluster 333 with one master aggregator node 340, one child aggregator node 342 and two leaf nodes 344, 346. There are four partitions 344 ($P_1$, $P_2$) 346 ($P_3$, $P_4$) spread across the leaf nodes.

Given this topology, the extractor 220 comprises a master aggregator 340 and leaf node partitions 344 ($P_1$, $P_2$) 346 ($P_3$, $P_4$), which collectively perform the following steps.

The master aggregator 340 connects to the Kafka lead broker 330 and requests metadata about the Kafka cluster (step 401, FIG. 4). This metadata includes information about the Kafka cluster's brokers, topics, and partitions.

The master aggregator 340 parses the metadata and learns that there are four partitions spread across two Kafka brokers 330, 332 (step 403). The master aggregator 340 also decides how to process Kafka topics, which are groups of partitions.

The master aggregator 340 assigns leaf node partitions 344 ($P_1$, $P_2$) 346 ($P_3$, $P_4$) to the Kafka partitions 330 ($P_1$, $P_2$) 332 ($P_3$, $P_4$) and sets the leaf nodes' configuration. The master aggregator 340 sets the maximum number of offsets to read per batch (step 405). Once configured, each leaf node of the extractor 220 effectively becomes a Kafka consumer. At a lower level, each partition in a leaf node is paired with a partition in a Kafka broker.

Once each partition 344 ($P_1$, $P_2$) 346 ($P_3$, $P_4$) in a leaf node has been paired with a Kafka partition 330 ($P_1$, $P_2$) 332 ($P_3$, $P_4$), each leaf node 344, 346 in the cluster begins extracting data directly from the Kafka brokers 330, 332 (step 407). The leaf nodes 334, 346 individually manage which message offsets have been read from a given Kafka partition.

Offsets are ingested in batches and held in staging, or sharded, tables (step 413) and the maximum number per batch is specified in the system variables associated with the extractor component 220, as configured by the pipeline engine 112.

Alternatively, each leaf node can be assigned to one mutually exclusive and exhaustive range of partition/offsets by the master aggregator 340, and each leaf node is thereafter responsible for performing steps 1-5 with respect to its uniquely assigned partition/offset. The alternative has advantages in terms of its simplicity, but suffers from the "leaves don't have perfect sharding information, and what happens if we failover" kind of problems. Also, if additional coordination is required, it might be difficult, for instance to prevent skew or keep partitions from getting radically out of sync. Further, without the master aggregator 340 controlling the processor it is difficult to ensure that a leaf node does not fail.

Either way, the extraction process is performed by the leaf nodes 334, 346 such that data is not directed through the master aggregator 340. This enables the parallelism of data extraction. Further, the staging table is sharded in a way that each leaf node partition 344 ($P_1$, $P_2$) 346 ($P_3$, $P_4$) knows exactly which Kafka partitions (thus offset ranges) it is responsible for. Preferably the leaf node partitions periodically stream data into their shard in a single database transaction.

The largest offset in the staging table is the batch considered the latest processed offset, and is managed by the pipeline engine 112: the latest loaded Kafka offsets are stored such that only when a Kafka message is reliably extracted, transformed, and loaded in the destination database are the offsets incremented by the pipeline engine 112. This guarantees each offset (i.e. each Kafka message in the current example) will be extracted into the staging table exactly-once, even in the event of failover/error (e.g. Kafka connectivity, improper transforms, malformed data).

In other embodiments, the pipeline engine 112 is configured to perform distributed data loading optimizations, such as reducing the total number of threads used, sharing data buffers, and minimizing intra-cluster connections.

Another benefit of the pipeline engine 112 relates to debugging: metadata is stored in INFORMATION_SCHEMA tables, which can be queried through SQL. This metadata includes errors, pipeline offsets, information about successful data loads, etc. and makes it easy for users to forensically analyze the outputs generated at the various stages of the data ingestion process. Additionally, components of the pipeline engine 112 can be altered online, e.g., via client terminal 106, which makes it easy for developers to tune parameters of the pipeline engine during application development.

Once data is in the staging table (step 413) it is stored in a table of the destination database 104 (step 415) under control of the data loader 224. This step involves the data loader 224 identifying a partition within the destination database 104 to which the extracted (and optionally transformed) data should be sent, using the shard key of the destination database 104. In one configuration, this step comprises executing an INSERT query (INSERT INTO <destination> SELECT * FROM <staging table>).

In a preferred embodiment, it is this query that triggers execution of the pipeline engine 112: it causes the extractor component 220 to read in rows from the data source 102 as described above, then the transform component 222 to transform them (if so specified) and the data loader 224 to provide the data to the above INSERT . . . SELECT query so the data can be moved efficiently into the correct partition of the destination database 104 using standard query processing techniques. In this way, the pipeline engine 112 can run as a regularly distributed query.

Returning to FIG. 2, the functionality of the transform component 222 will now be described. A transform component 222 is a user-defined program that executes arbitrary code to transform extracted data into, e.g., CSV format. The transformed CSV data is written into a specified table in the destination database 104 by the data loader 224. As noted above, the transform component 222 is optional, since, e.g., for certain retrieval operations, no such transform is required.

Transform components 222 can be specified as part of the data definition language (DDL) of the pipeline engine 112. Typically, they take the form of user-defined scripts that enrich and map external data for loading into the destination database 104, and can be written in any programming language, providing familiarity and flexibility. This is particularly useful for application-specific analytics that is to be performed on the data once it has been stored in the destination database 104.

According to embodiments, a transform is specified when creating a new pipeline. For example, in the code below, the particular transform is my-transform.tar.gz:

```
CREATE PIPELINE mypipeline AS
LOAD DATA KAFKA '192.168.1.100:9092/my-topic'
WITH TRANSFORM ('http://www.memsql.com/my-transform.tar.gz', 'my-executable.py', '')
INTO TABLE t
```

When the CREATE PIPELINE statement is executed, the file that specifies the functionality of the transform component 222 must be accessible at the specified file system or network endpoint.

Referring again to FIG. 4, if a transform file was specified when the pipeline was created (schematically indicated as step 409), the master aggregator 340 provides the transform file to the leaf nodes at step 411. In this way, the master aggregator 340 is responsible for ensuring that each leaf node 334, 346 executes the same transform, so that for this example the file "my-transform.tar.gz" is downloaded and provided to every leaf node 334, 346 in the cluster (e.g. via RPC or mail). The master aggregator 340 may additionally perform checksum checks on the file prior to providing the file to the leaf nodes.

Since transforms are arbitrary code that are created independently of the pipeline engine 112 and process, their resource utilization is preferably tracked and limited. Furthermore, the pipeline engine 112 may be configured to track transform memory consumption internally. Tracking of transform memory prevents the pipeline engine 112 from allocating too much memory to the transform component and running into Out of Memory (OOM) errors. Preferably the amount of memory used by any given transform component 222 is specified as a parameter associated with the corresponding file in the form of an upper bound, and provided as input to the pipeline engine 112.

The pipeline engine 112, including components thereof as described above, may be written in the C++ programming code, and interface with the data structures and compilation techniques as described in US patents U.S. Pat. Nos. 9,317,552, 9,135,310, 9,223,805 and 9,141,678, all owned by the assignee of the present application, the entire teachings of which are incorporated herein by reference.

It will be appreciated that at least parts of the methods discussed above with reference to FIGS. 1 to 4 may be implemented using software instructions stored on a computer useable storage medium for execution by a computing device. As an example, an embodiment of a computer program product includes a computer useable storage medium to store a computer readable program that, when executed on a computing device, causes the computing device to perform operations, as described hereinbefore. Furthermore, embodiments can be embodied in the form of a computer program product accessible from a computer-usable or computer-readable medium providing program code for use by or in connection with a computing device or any instruction execution system. For the purposes of this description, a computer-usable or computer-readable medium can be any apparatus that can contain, store, communicate, propagate, or transport the program for use by or in connection with the instruction execution system, apparatus, or device. The apparatus may be a transitory or a non-transitory computer-readable medium. For example, the computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital versatile disk (DVD).

Exemplary syntax for creating and configuring a pipeline object using the pipeline engine 112 and its component parts, as described herein, are described in the following paragraphs.

Create Pipeline

The CREATE PIPELINE clause creates a new pipeline in a destination database such as a MemSQL database. The complete syntax is shown below:

CREATE PIPELINE Syntax:

```
CREATE PIPELINE [IF NOT EXISTS] pipeline_name AS
    LOAD DATA KAFKA 'kafka_topic_endpoint'
    [BATCH_INTERVAL milliseconds]
    [WITH TRANSFORM ( 'uri' , ['executable' , 'arguments
[ . . . ] ']) ]
    [REPLACE | IGNORE]
    INTO TABLE table_name
    [FIELDS | COLUMNS]
    [TERMINATED BY 'string'
        [[OPTIONALLY] ENCLOSED BY 'char']
        [ESCAPED BY 'char']
    ]
    [LINES
        [STARTING BY 'string']
        [TERMINATED BY 'string']
    ]
    [IGNORE number LINES]
    [ (column_name, ... ) ]
    [ON DUPLICATE KEY UPDATE column name = expression, [...]]
```

The CREATE PIPELINE clause uses standard LOAD DATA syntax options, for which, see below.

The following example statement demonstrates the minimum way to create a pipeline:

```
CREATE PIPELINE mypipeline AS
LOAD DATA KAFKA '127.0.0.1/my-topic'
INTO TABLE t;
```

This statement creates a new pipeline named my_pipeline, uses a Kafka cluster as the data source, points to the location of the my-topic topic at the Kafka cluster's endpoint, and will start ingesting data into my_table.

Each of the clauses in a CREATE PIPELINE statement are described below.

Load Data

AS LOAD DATA: data can be loaded by specifying Kafka or a file as the pipeline's data source. AS LOAD DATA KAFKA ['topic_endpoint']: To use Kafka as a data source, the endpoint for the Kafka cluster and the path to a specific topic with the cluster must be specified. [BATCH_INTERVAL milliseconds]: a batch interval can be specified in milliseconds, which is the time duration between the end of a batch operation and the start of the next one. If a batch interval is not specified, the default value is 0, which results in the extractor batching data as quickly as possible.

```
LOAD DATA Example:
LOAD DATA KAFKA '127.0.0.1/my-topic'
LOAD DATA with BATCH INTERVAL Example:
LOAD DATA KAFKA '127.0.0.1/my-topic'
BATCH_INTERVAL 500
```

With Transform

Pipeline source data can be transformed by specifying an executable program. The data is transformed after the extraction process and before it is loaded into the database.

WITH TRANSFORM ('uri', ['executable', 'arguments [ . . . ]']): Each of the transform's parameters are described below.

uri: The transform's URI is the location from where the executable program can be downloaded, which is specified as either an http:// or file:// endpoint. If the URI points to a tarball with a .tar.gz or .tgz extension, its contents will be automatically extracted. Additionally, the executable parameter must be specified if the uri is a tarball. If the URI specifies an executable file itself, the executable and arguments parameters are optional.

executable: The filename of the transform executable to run. This parameter is required if a tarball was specified as the endpoint for the transform's url. If the url itself specifies an executable, this parameter is optional.

arguments: A series of arguments that are passed to the transform executable at runtime.

Transform as executable:
WITH TRANSFORM('http://memsql.com/my-transform.py')

Transform as tarball:
WITH TRANSFORM('http://memsql.com/my-transform-tarball.tar.gz', 'my-executable.py')

Transform as tarball with arguments:
WITH TRANSFORM('http://memsql.com/my-transform-tarball.tar.gz', 'my-executable.py', '-arg1 -arg1')

Drop Pipeline

The DROP PIPELINE clause deletes a pipeline. If the pipeline is currently running, the clause will stop it before deleting it.

DROP PIPELINE Syntax:

DROP PIPELINE pipeline_name;

After a pipeline has been dropped, any data related to the pipeline will also be deleted from the information schema tables associated with the Pipelines feature.

DROP PIPELINE Example:

```
memsql> SHOW PIPELINES;
    Pipelines_in_mydatabase      |    State
    quickstart_kafka             |    Running
1 row in set (0.00 sec)
memsql> DROP PIPELINE quickstart_kafka;
Query OK, 0 rows affected (0.00 sec)
memsql> SHOW PIPELINES;
Empty set (0.00 sec)
```

Show Pipeline

All existing pipelines in a database and their current state can be viewed by using the SHOW PIPELINE statement. Possible states are Running, Stopped and Error.

SHOW PIPELINE Example:

```
memsql> USE mydb; SHOW PIPELINES;
    Pipelines_in_mydb      |   State
    mypipeline             |   Running
    myotherpipeline        |   Stopped
2 rows in set (0.00 sec)
```

Start Pipeline

The START PIPELINE statement starts an existing pipeline in a MemSQL database. An error will occur if the pipeline is already running.
   START PIPELINE Syntax:
   START PIPELINE pipeline_name;
   START PIPELINE Example:
   memsql> START PIPELINE mypipeline;

Stop Pipeline

The STOP PIPELINE statement stops a currently running pipeline in a MemSQL database. An error will occur if the pipeline isn't already running.
   STOP PIPELINE Syntax:
   STOP PIPELINE pipeline_name;
   STOP PIPELINE Example:
   memsql> STOP PIPELINE mypipeline;

Test Pipeline

The TEST PIPELINE statement tests an existing pipeline in a MemSQL database. When a pipeline is tested, data extraction and transformation occurs, but no output is inserted into the destination table.

When testing a pipeline, it must first be stopped. An error will occur if the pipeline is currently running.
   TEST PIPELINE Syntax:
   TEST PIPELINE pipeline_name [LIMIT count];

The number of data source offsets to test can be limited by specifying a LIMIT clause, such as LIMIT 1.

Alter Pipeline

The ALTER PIPELINE statement changes an existing pipeline's configuration.
   ALTER PIPELINE Syntax:

```
ALTER PIPELINE pipeline_name
  [SET
    [OFFSETS
      [EARLIEST | LATEST | json_source_partition_offset]
    ]
    [TRANSFORM ('uri', ['executable', 'arguments [...]'])]
    [BATCH_INTERVAL milliseconds]
  ]
  [FIELDS | COLUMNS]
    [TERMINATED BY 'string'
      [[OPTIONALLY] ENCLOSED BY 'char']
      [ESCAPED BY 'char']
    ]
```

Each of the clauses in an ALTER PIPELINE statement are described below.

Alter Pipeline Set

A pipeline's offsets, transform, or batch interval can be configured by using the SET clause.
   ALTER PIPELINE SET Syntax:

```
ALTER PIPELINE pipeline_name
  [SET
    [OFFSETS
      [EARLIEST | LATEST | json_source_partition_offset]
    ]
    [TRANSFORM]
    [BATCH_INTERVAL milliseconds]
  ]
```

Alter Pipeline Set Offsets

A pipeline's current starting offset can be altered by using the SET OFFSETS clause. When a new offset is set, the pipeline will begin extracting data from the specified offset, regardless of any previous offsets that have or have not been extracted. There are three offset options:

SET OFFSETS EARLIEST: Configures the pipeline to start reading from the earliest (or oldest) available offset in the data source.

SET OFFSETS EARLIEST Example:

ALTER PIPELINE mypipeline SET OFFSETS EARLIEST;

SET OFFSETS LATEST: Configures the pipeline to start reading from the latest (or newest) available offset in the data source.

SET OFFSETS LATEST Example:

ALTER PIPELINE mypipeline SET OFFSETS LATEST;

SET OFFSETS '{"<source-partition>": <partition-offset>}': Configures the pipeline to start reading from specific data source partitions and offsets. When manually specifying which source partition and offset to start extracting from, there are a few important things to consider. If the data source has more partitions than are specified in the JSON string, only data from the specified offsets will be extracted. No new offsets from the other partitions will be extracted. If the specified source partition does not exist, no data will be extracted and no errors will appear. However, the partition will be present in a row of the information_schema.PIPELINES_OFFSETS table with its EARLIEST_OFFSET, LATEST_OFFSET, and LATEST_LOADED_OFFSET columns set to NULL.

SET OFFSETS JSON Example:

ALTER PIPELINE mypipeline SET OFFSETS '{"0", 100}, {"1", 100}';

In the example above, the data source has two partitions with IDs of 0 and 1, and the pipeline will start reading from offset 100 in both partitions.

Alter Pipeline Set Transform

An existing pipeline can be configured to use a transform using the SET TRANSFORM clause. The syntax for applying a transform to a pipeline is identical to the WITH TRANSFORM syntax that is used when creating a new pipeline (see CREATE PIPELINE above).

Alter Pipeline Set Batch Interval

The batch interval for an existing pipeline can be altered using the SET BATCH_INTERVAL clause. A batch interval is the time duration between the end of a batch operation and the start of the next one. The syntax for setting a batch interval is identical to the BATCH_INTERVAL syntax that is used when creating a new pipeline (see CREATE PIPELINE above).

Show Create Pipeline

The SHOW CREATE PIPELINE clause can be used to output a CREATE PIPELINE statement that can be used to duplicate the configuration and state of an existing pipeline.

SHOW CREATE PIPELINE Syntax:
SHOW CREATE PIPELINE pipeline_name [EXTENDED]
SHOW CREATE PIPELINE Example:

```
memsql> SHOW CREATE PIPELINE mypipeline EXTENDED;
    Pipeline      |   Create Pipeline
    mypipeline    |   CREATE PIPELINE 'mypipeline'
AS LOAD DATA KAFKA '127.0.0.1/my-topic'
BATCH_INTERVAL 0
IGNORE
INTO TABLE 't'
FIELDS TERMINATED BY ',' ENCLOSED BY ' ' ESCAPED BY '\'
LINES TERMINATED BY '\n' STARTING BY ' '
('data', 'col1', 'col2') |
| ALTER TABLE | ALTER PIPELINE 'mypipeline' SET OFFSETS
'{\"8\":5}'
```

In the example above, the first column contains the name of the pipeline. The second column contains the CREATE PIPELINE statement used to create a new pipeline with the same configuration. The third and fourth column only appear when the EXTENDED clause is added to the statement. These columns contain the ALTER statements that can be used to set a new pipeline's offsets to the same state as the current pipeline, namely to start reading from the most recently loaded offset.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure, which is defined in the accompanying claims.

What is claimed is:

1. A non-transitory computer-readable medium comprising a set of instructions, which, when executed by a processing system associated with a distributed database having a plurality of nodes, causes the processing system to:
    identify a batch of data to be retrieved from a streaming data source in accordance with a mapping between a first set of partitions and a second set of partitions, the first set of partitions being associated with the streaming data source and the second set of partitions being associated with respective nodes of the database and the mapping based on offset ranges to uniquely identify each data in each said partition of the first set of partitions; and
    retrieve the identified batch of data and load the retrieved data into the plurality of nodes of the database in accordance with the mapping;
    wherein retrieving the data and loading the retrieved data for an identified batch of data comprises an atomic distributed transaction for loading the data exactly once, the atomic distributed transaction comprising:
        each node performing a database pull transaction to pull data from a respective partition of the first set of partitions into a staging table according to the mapping,
        wherein the database pull transactions of the nodes pull data in parallel from the first set of partitions;
        each node loading the retrieved data from the respective database pull transaction into the database;
        recording metadata in the database confirming loading of the batch of data into the database;
        wherein the batch of loaded data and the metadata is committed atomically only upon the retrieving and the loading of all of the data by all the nodes associated with the database and the recording of the metadata in the database.

2. The non-transitory computer-readable medium of claim 1, wherein the set of instructions, when executed by the processing system, causes each partition of the second set of partitions to retrieve data from the data source independently of retrieving data from the data source by any other partition of the second set of partitions.

3. The non-transitory computer-readable medium of claim 2, wherein the set of instructions, when executed by the processing system, causes each partition of the second set of partitions to retrieve data from the data source in parallel with retrieving data from the data source by at least one other partition of the second set of partitions.

4. The non-transitory computer-readable medium of claim 1, wherein the set of instructions, when executed by the processing system, further causes the processing system to:
    request metadata relating to the first set of partitions; and
    use the metadata to configure the retrieving such that each partition of the second set of partitions performs the retrieving independently of retrieving data from the data source by any other partition of the second set of partitions.

5. The non-transitory computer-readable medium of claim 4, wherein the set of instructions, when executed by the processing system, further causes each partition of the second set of partitions to retrieve data from the data source in parallel with retrieving data from the data source by at least one other partition of the second set of partitions.

6. The non-transitory computer-readable medium of claim 1, wherein the set of instructions, when executed by the processing system, further causes the processing system to:
    access a file specifying a transform to be applied to the data retrieved from the data source; and
    transform the data retrieved from the data source in accordance with the transform,
    wherein the loading the retrieved data into the database comprises loading the transformed data into the database.

7. A distributed database system comprising:
    a plurality of nodes;
    at least one processor; and
    at least one memory including computer program instructions,
    the at least one memory and the computer program instructions being configured to, with the at least one processor, cause the database system at least to:
        identify a batch of data to be retrieved from a plurality of streaming data sources in accordance with a mapping between a first set of partitions and a second set of partitions, the first set of partitions being associated with the streaming data source and the second set of partitions being associated with respective nodes of the database, and mapping based on offset ranges to uniquely identify each data in each said partition of the first set of partitions; and
        retrieve the identified batch of data and load the retrieved data into the plurality of nodes of the database in accordance with the mapping,
        wherein retrieving the data and loading the retrieved data for an identified batch of data comprise an atomic distributed transaction for loading the data exactly once, the atomic distributed transaction comprising:

each node performing a database pull transaction to pull data from a respective partition of the first set of partitions into a staging table according to the mapping;

wherein the database pull transactions of the nodes pull data in parallel from the first set of partitions;

each node loading the retrieved data from the respective database pull transaction into the database;

recording metadata in the database confirming loading of the batch of data into the database;

wherein the batch of loaded data and the metadata is committed atomically only upon the retrieving and the loading of all of the data in the batch by all the nodes associated with the database and the recording of the metadata in the database.

8. The database system of claim 7, wherein the computer program instructions, when executed by the at least one processor, causes each partition of the second set of partitions to retrieve data from the data source independently of retrieving data from the data source by any other partition of the second set of partitions.

9. The database system of claim 8, wherein the computer program instructions, when executed by the at least one processor, causes each partition of the second set of partitions to retrieve data from the data source in parallel with retrieving data from the data source by at least one other partition of the second set of partitions.

10. The database system of claim 7, wherein the computer program instructions, when executed by the at least one processor, further causes the at least one processor to:

request metadata relating to the first set of partitions; and use the metadata to configure the retrieving such that each partition of the second set of partitions performs the retrieving independently of retrieving data from the data source by any other partition of the second set of partitions.

11. The database system of claim 10, wherein the computer program instructions, when executed by the at least one processor, further causes each partition of the second set of partitions to retrieve data from the data source in parallel with retrieving data from the data source by at least one other partition of the second set of partitions.

12. The database system of claim 7, wherein the computer program instructions, when executed by the at least one processor, further causes the at least one processor to:

access a file specifying a transform to be applied to the data retrieved from the data source; and transform the data retrieved from the data source in accordance with the transform, wherein the loading the retrieved data into the database comprises loading the transformed data into the database.

13. A method executed by a processing system associated with a distributed database having a plurality of nodes, the method comprising:

identifying a batch of data to be retrieved from a streaming data source in accordance with a mapping between a first set of partitions and a second set of partitions, the first set of partitions being associated with the streaming data source and the second set of partitions being associated with respective nodes of the database, and mapping based on offset ranges to uniquely identify each data in each said partition of the first set of partitions; and retrieving the identified batch of data and loading the retrieved data into the plurality of nodes of the database in accordance with the mapping, wherein retrieving the data and loading the retrieved data for an identified batch of data comprises an atomic distributed transaction for loading the data exactly once, the atomic distributed transaction comprising:

each node performing a database pull transaction to pull data from a respective partition of the first set of partitions into a staging table according to the mapping;

wherein the database pull transactions of the nodes pull data in parallel from the first set of partitions;

each node loading the retrieved data from the respective database pull transaction into the database;

recording metadata in the database confirming loading of the batch of data into the database;

wherein the batch of loaded data and the metadata is committed atomically only upon the retrieving and the loading of all of the data in the batch by all the nodes associated with the database and the recording of the metadata in the database.

14. The method of claim 13, wherein each partition of the second set of partitions retrieves data from the data source independently of retrieving data from the data source by any other partitions of the second set of partitions.

15. The method of claim 14, wherein each partition of the second set of partitions retrieves data from the data source in parallel with retrieving data from the data source by at least one other partition of the second set of partitions.

16. The method of claim 13, further comprising:

requesting metadata relating to the first set of partitions; and using the metadata to configure the retrieving such that each partition of the second set of partitions performs the retrieving independently of retrieving data from the data source by any other partition of the second set of partitions.

17. The method of claim 16, wherein each partition of the second set of partitions retrieves data from the data source in parallel with retrieving data from the data source by at least one other partition of the second set of partitions.

18. The method of claim 13, further comprising:

accessing a file specifying a transform to be applied to the data retrieved from the data source; and transforming the data retrieved from the data source in accordance with the transform, wherein the loading the retrieved data into the database comprises loading the transformed data into the database.

* * * * *